(12) United States Patent
Li

(10) Patent No.: US 11,689,069 B2
(45) Date of Patent: Jun. 27, 2023

(54) STATOR DEVICE FOR MOTOR AND METHOD FOR MANUFACTURING THE SAME

(71) Applicant: Yueh-Han Li, Guanshan Township (TW)

(72) Inventor: Yueh-Han Li, Guanshan Township (TW)

( * ) Notice: Subject to any disclaimer, the term of this patent is extended or adjusted under 35 U.S.C. 154(b) by 0 days.

(21) Appl. No.: 17/541,979

(22) Filed: Dec. 3, 2021

(65) Prior Publication Data

US 2022/0181925 A1  Jun. 9, 2022

(30) Foreign Application Priority Data

Dec. 7, 2020  (TW) .................................. 109143026

(51) Int. Cl.
*H02K 5/15* (2006.01)
*H02K 1/18* (2006.01)
*H02K 7/08* (2006.01)
*H02K 5/16* (2006.01)

(52) U.S. Cl.
CPC ............. *H02K 1/187* (2013.01); *H02K 5/163* (2013.01); *H02K 7/085* (2013.01)

(58) Field of Classification Search
CPC ........... H02K 5/15; H02K 5/161; H02K 9/223
See application file for complete search history.

(56) References Cited

U.S. PATENT DOCUMENTS

| 8,278,803 | B2* | 10/2012 | Lin ..................... H02K 5/15 310/411 |
| 8,552,600 | B2* | 10/2013 | Bradfield ............... H02K 5/203 310/43 |
| 9,246,370 | B2* | 1/2016 | Hossain ................. H02K 9/223 |
| 10,211,706 | B2* | 2/2019 | Hayashi ................. H02K 9/227 |
| 11,418,093 | B2* | 8/2022 | Arai ....................... H02K 9/223 |
| 2008/0042502 | A1* | 2/2008 | VanLuik ................ H02K 5/128 310/90 |
| 2013/0106210 | A1* | 5/2013 | Tsutsui .................. H02K 5/128 310/52 |
| 2013/0136630 | A1* | 5/2013 | Eguchi ................... H02K 5/128 417/366 |

* cited by examiner

*Primary Examiner* — Dang D Le
(74) *Attorney, Agent, or Firm* — Birch, Stewart, Kolasch & Birch, LLP

(57) ABSTRACT

A stator device for a motor including a shaft includes two spaced-apart base seats, a stator and a gel body. Each of the base seats includes a base member and a bearing receiving groove open away from the other one of the base seats along the axis. The base member is formed with an axial hole extending along an axis of the shaft through the base member and permitting the shaft to extend therethrough. The stator is disposed around the shaft and between the base members, and includes a core and a coil disposed around the core. The gel body is attached to and disposed around at least a portion of the stator, and is attached to one of the base seats so as to position the stator relative to the one of the base seats.

8 Claims, 12 Drawing Sheets

STATOR DEVICE FOR MOTOR AND METHOD FOR MANUFACTURING THE SAME

CROSS-REFERENCE TO RELATED APPLICATION

This application claims priority of Taiwanese Patent Application No. 109143026, filed on Dec. 7, 2020.

FIELD

The disclosure relates to a driving device, and more particularly to a stator device for a motor and a method for manufacturing the same.

BACKGROUND

A power assist transmission device for an electric bicycle includes a motor for generating power to be transmitted a rear wheel of the electric bicycle to drive the electric bicycle to move. Generally, in order not to adversely affect the appearance of the electric bicycle, the motor is usually mounted in a space in a bottom bracket of the electric bicycle, so that heat generated by the motor cannot be effectively dissipated out.

Referring to FIG. 1, a conventional motor is mounted in a tube wall 19 of a bottom bracket of an electric bicycle (not shown), and includes a first housing 11, a second housing 12, a rotary shaft 14, a stator 15, a rotor 16, a gel body 17 and two bearing sets 18. The second housing 12 cooperates with the first housing 11 to define a receiving space 13 therebetween. The rotary shaft 14 rotatably extends through the first housing 11 and the second housing 12. The stator 15 is disposed in the receiving space 13 and surrounds the rotary shaft 14. The rotor 16 is connected co-rotatably to the rotary shaft 14 and is surrounded by the stator 15.

The first housing 11 includes a top wall 111 spaced apart from the second housing 12 along an axis of the rotary shaft 14, and a surrounding wall 112 connected between the top wall 111 and the second housing 12. The gel body 17 is disposed around the stator 15, is connected to the surrounding wall 112, and is spaced apart from the top wall 111 and the second housing 12 along the axis of the rotary shaft 14. The bearing sets 18 are disposed in the receiving space 13, are respectively sleeved on opposite ends of the rotary shaft 14, and are mounted respectively to the top wall 111 of the first housing 11 and the second housing 12.

By virtue of the arrangement of the gel body 17, heat generated by the motor can be conducted to the surrounding wall 112 and the tube wall 19 of the bottom bracket of the electric bicycle and then be dissipated out of the bottom bracket. However, after a period time of use, connection portions between the rotary shaft 14 and each of the bearing sets 18 may wear out. Since the bearing sets 18 are disposed in the receiving space 13 defined between the first and second housings 11, 12, it is troublesome to repair the bearing sets 18.

Referring to FIG. 2, another conventional motor similar to the conventional motor in FIG. 1 is shown, and the difference therebetween reside in the following. The top wall 111 and the surrounding wall 112 of the conventional motor shown in FIG. 1 are formed integrally while the top wall 111' and the surrounding wall 112' of the conventional motor shown in FIG. 2 are manufactured separately and are assembled together by a plurality of fastening members 10. Thus, the top wall 111' can be removed from the surrounding wall 112' to facilitate repair of the upper one of the bearing sets 18 disposed on the top wall 111'. However, heat generated by the conventional motor shown in FIG. 2 still cannot be dissipated effectively.

SUMMARY

Therefore, an object of the disclosure is to provide a stator device for a motor that can alleviate at least the drawback of the prior art.

According to an aspect of the present disclosure, a stator device for a motor including an output shaft extending along an axis is provided. The stator device includes two base seats, a stator and a gel body. The base seats are spaced apart from each other along the axis. Each of the base seats includes a base member and a bearing receiving groove and has a connecting surface facing away from the bearing-receiving groove. The base member is formed with an axial hole extending along the axis through the base member and adapted to permit the output shaft to extend therethrough. The bearing-receiving groove is open away from the other one of the base seats along the axis. The stator is adapted to be disposed around the output shaft and between the base members of the base seats, and includes a core and a coil that is disposed around the core. The gel body is attached to and disposed around at least a portion of the stator, and is attached to one of the base seats so as to position the stator relative to the one of the base seats.

According to another aspect of the present disclosure, a method for manufacturing a stator device for a motor including an output shaft extending along an axis is provided. The method includes following steps:

providing two base seats that are spaced apart from each other along the axis, each of the base seats including a base member that is formed with an axial hole extending along the axis through the base member and a bearing-receiving groove open away from the other one of the base seats along the axis, and a stator disposed between the base members of the base seats, and including a core and a coil disposed around the core;

infusing a gel material among the stator and the base seats to cover at least a portion of the stator and connect the stator to the base seats; and solidifying the gel material to form a gel body to position the stator relative to the base seats.

According to still another aspect of the present disclosure, a method for manufacturing a stator device for a motor including an output shaft extending along an axis is provided. The method includes following steps:

providing two base seats that are spaced apart from each other along the axis, each of the base seats including a base member that is formed with an axial hole extending along the axis through the base member and a bearing-receiving groove open away from the other one of the base seats along the axis, and a stator disposed between the base members of the base seats, and including a core and a coil that is disposed around the core;

infusing a gel material between the stator and one of the base seats to cover at least a portion of the stator and connect the stator to the one of the base seats;

solidifying the gel material to form a gel body to position the stator relative to the one of the base seats; and connecting the stator to the other one of the base seats.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
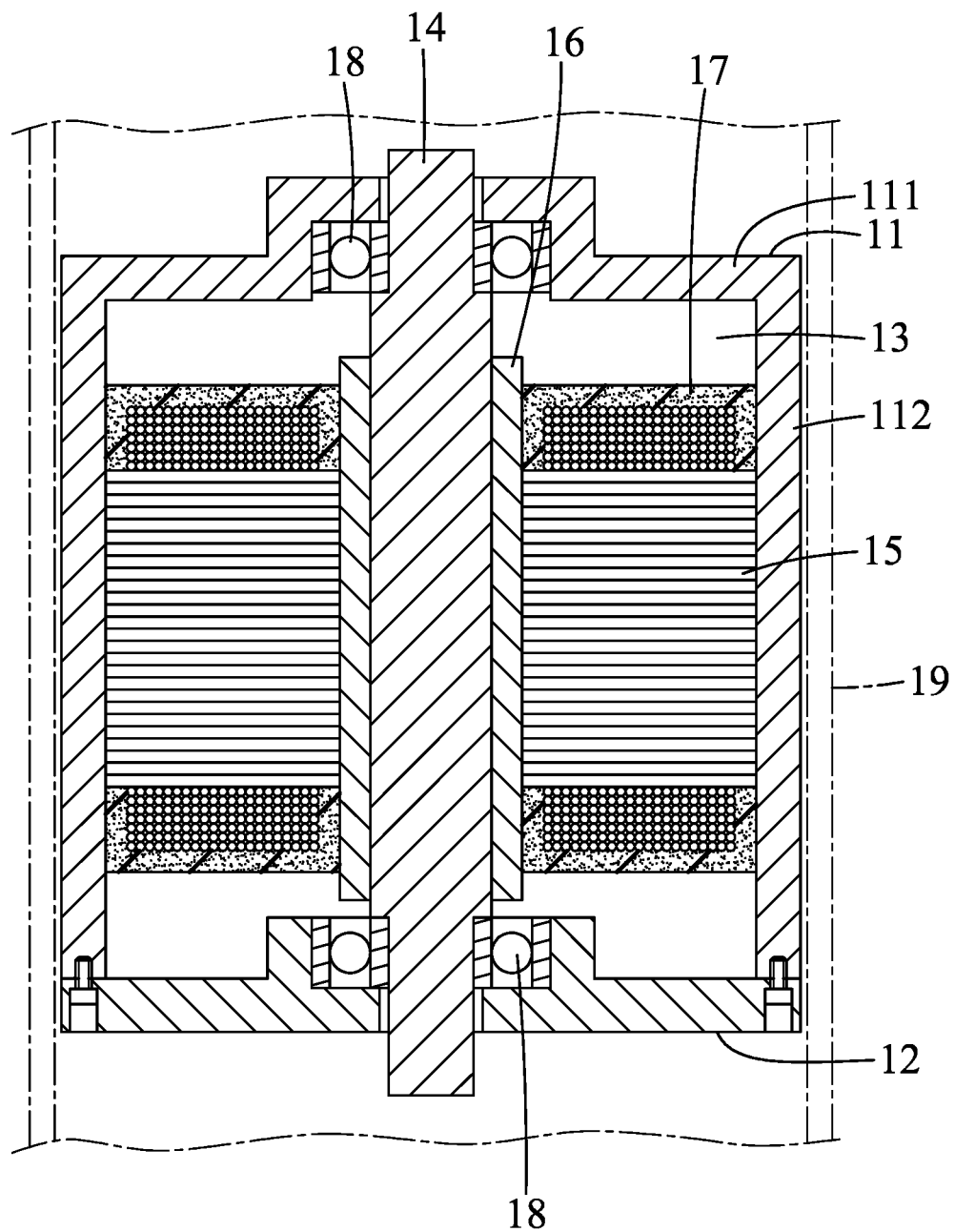
FIG. 1 is a fragmentary schematic sectional view of a conventional motor.
Figure 2:
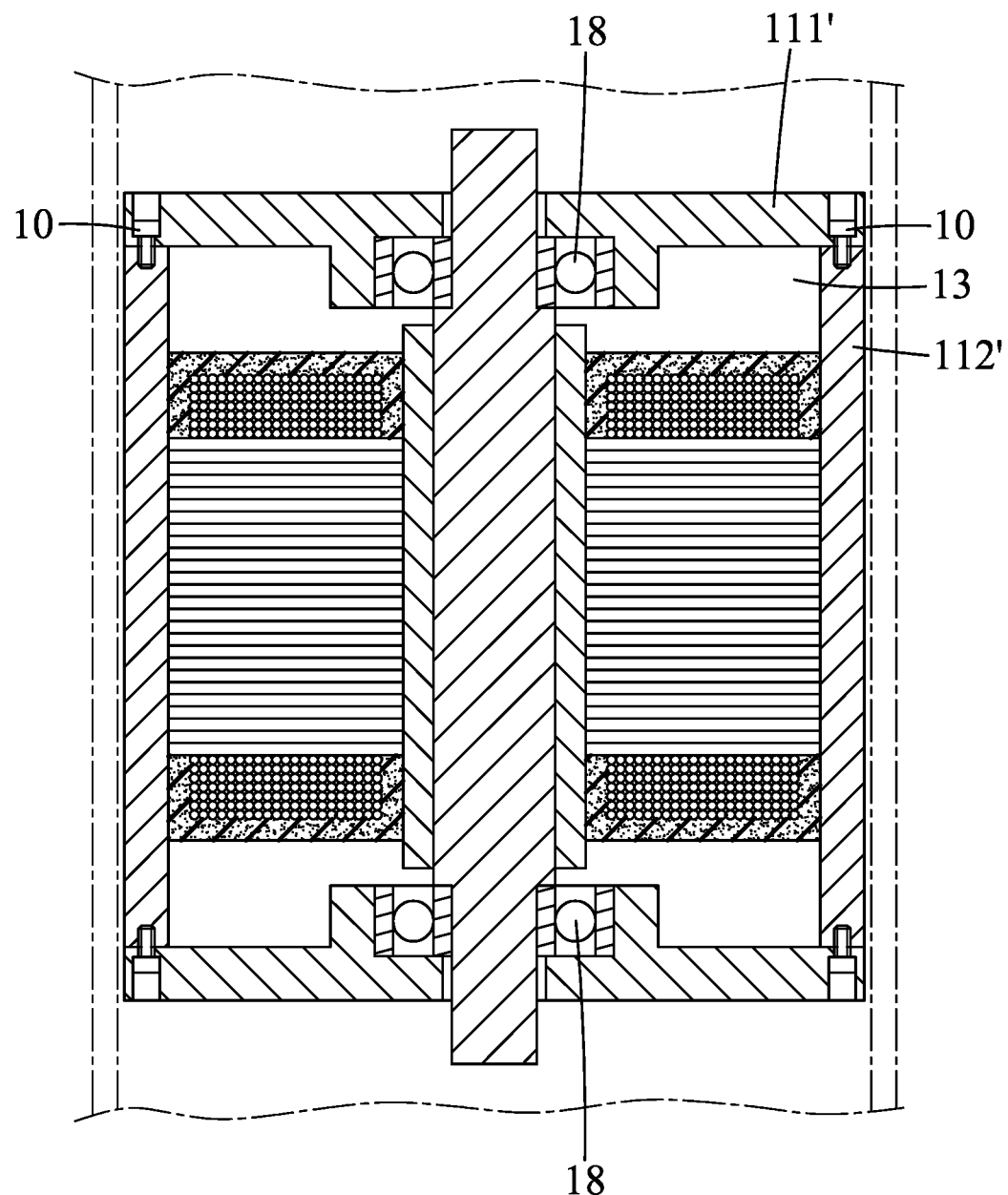
FIG. 2 is a fragmentary schematic sectional view of another conventional motor.

Before the present disclosure is described in greater detail, it should be noted herein that like elements are denoted by the same reference numerals throughout the disclosure.

Figure 3:
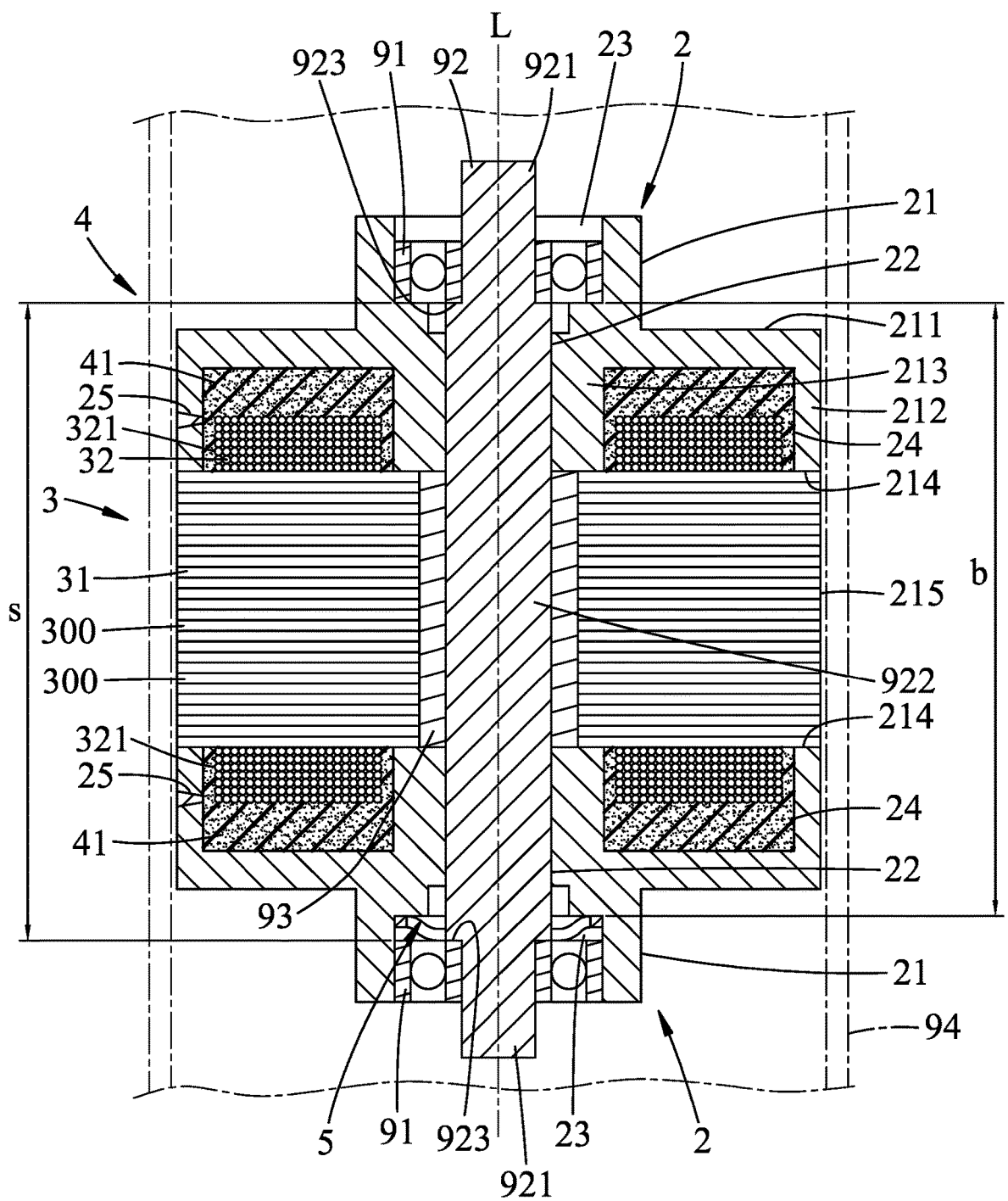
FIG. 3 is a fragmentary schematic sectional view illustrating a first embodiment of a stator device for a motor that includes two bearing sets, an output shaft, and a rotor according to the present disclosure.
Figure 4:
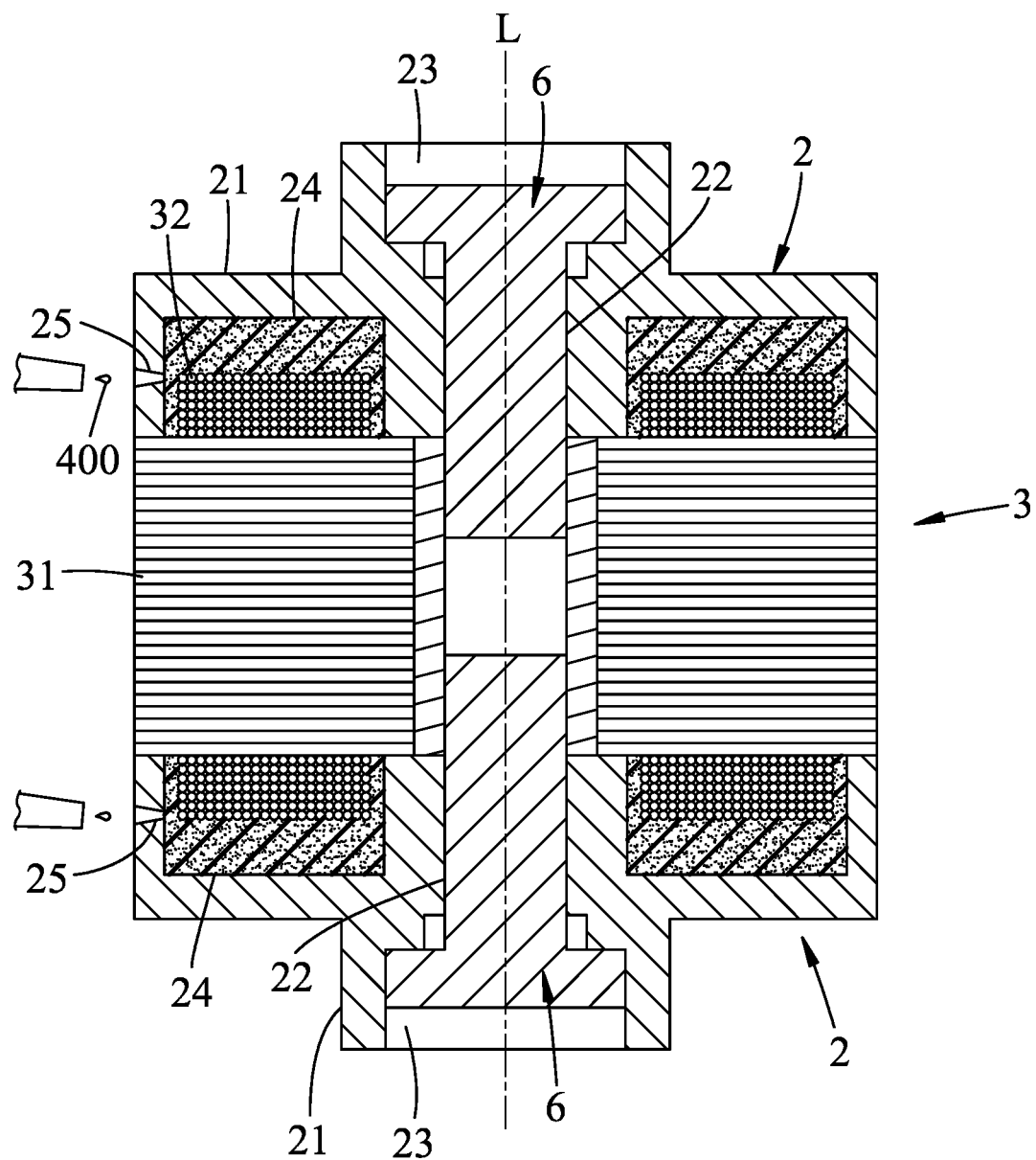
FIG. 4 is a schematic sectional view illustrating how the stator device of the first embodiment is manufactured.

Referring to FIGS. 3 and 4, a motor having a stator device of a first embodiment according to the present disclosure is shown. The motor is mounted in a bottom bracket 94 of an electric bicycle (not shown), and includes two bearing sets 91, an output shaft 92, and a rotor 93. The rotor 93 is disposed in the stator device and around the output shaft 92. The output shaft 92 extends along an axis (L) and includes a rotating segment 922, two abutment segments 921 connected respectively to opposite ends of the rotating segment 922 along the axis (L) and each having a diameter smaller than that of the rotating segment 922, and two shoulders 923 each formed between the rotating segment 922 and a respective one of the abutment segments 921. The bearing sets 91 abut respectively against the shoulders 923.

The stator device includes two base seats 2, a stator 3, a gel body 4 and a biasing member 5. The base seats 2 are spaced apart from each other along the axis (L). Each of the base seats 2 includes a base member 21 and a bearing-receiving groove 23 open away from the other one of the base seats 2 along the axis (L). The base member 21 of each of the base seats 2 has a connecting surface 214 facing away from the bearing-receiving groove 23, is formed with an axial hole 22 extending along the axis (L) through the base member 21 and adapted to permit the output shaft 92 to extend therethrough, a receiving space open away from the bearing-receiving groove 23 along the axis (L), and a gel infusing hole 25 in spatial communication with ambient surroundings, in fluid communication with the receiving space 24, and adapted to permit a gel material 400 (see FIG. 4) to be infused into the receiving space 24 to form the gel body 4. The bearing-receiving grooves 23 of the base seats 2 are adapted to respectively receive the bearing sets 91 therein.

The biasing member 5 is disposed in one of the bearing-receiving grooves 23, is adapted to be connected to and biasing one of the bearing sets 91 that is received in one of the bearing-receiving grooves 23 away from the other one of the bearing sets 91. In this embodiment, the biasing member 5 is a wave spring that is pre-loaded to bias one of the bearing sets 91 toward the other so as to allow for a manufacturing error in dimensions of the bearing-receiving grooves 23.

The base member 21 of each of the base seats 2 includes a base wall 211, an outer surrounding wall 212, and an inner surrounding wall 213. The base wall 211 includes an inner periphery and an outer periphery. The outer surrounding wall 212 extends from the outer periphery of the base wall 211 toward the base member 21 of the other one of the base seats 2, and has the connecting surface 214. The inner surrounding wall 213 extends from the inner periphery of the base wall 211 toward the base member 21 of the other one of the base seats 2, defines the axial hole 22, is surrounded by the outer surrounding wall 213, and cooperates with the base wall 211 and the outer surrounding wall 212 to define the receiving space 24. The connecting surfaces 214 of the base members 21 are spaced apart from each other and define an opening 215 in spatial communication with ambient surroundings for dissipating heat generated by the motor.

The stator 3 is adapted to be disposed around the output shaft 92 and between the base members 21 of the base seats 2, is adapted to drive the rotor 93 and the output shaft 92 to rotate about the axis (L) relative to the stator device of the motor. The stator 3 includes a core 31 and a coil 32. The core 31 is disposed between the base members 21 and has an outer peripheral portion disposed between and aligned with the connecting surfaces 214. The coil 32 is disposed around the core 31 and includes two insertion portions 321 disposed respectively in the receiving spaces 24 of the base seats 2. In this embodiment, the core 31 includes a plurality of silicon steel plates 300 stacked together.

The gel body 4 is attached to and disposed around at least a portion of the stator 3, and is attached to the base seats 2 so as to position and fix the stator 3 relative to the base seats 2. In this embodiment, the gel body 4 includes two first surrounding portions 41 disposed respectively in the receiving spaces 24 and each surrounding a corresponding one of the insertion portions 321.

The advantage of the stator device of this embodiment resides in that by virtue of the arrangement of the gel body 4, the base seats 2 are disposed to be spaced apart from each other along the axis (L) and at least a portion of the core 31 is disposed between the connecting surfaces 214 such that heat generated by the motor can be conducted to the bottom bracket 94 through the opening 215 to increase heat dissipating effect. Additionally, since the bearing sets 91 are disposed respectively in the bearing-receiving grooves 23 that are open away from each other and that are not disposed in the receiving spaces 24, it is relatively convenient to repair the bearing sets 91 as required.

Further, as shown in FIG. 3, it should be noted that a distance (b) between the bearing-receiving grooves 23 is different from a distance (s) between the shoulders 923 of the output shaft 92, the biasing member 5 disposed in one of the bearing-receiving slot 23 biases one of the bearing sets 91 away from the other one of the bearing sets 91 so that the bearing sets 91 abut respectively against the shoulders 923 of the output shaft 92 to prevent the bearing sets 91 from contacting the rotating segment 922 of the output shaft 92, which adversely affects rotation of the output shaft 92.

As shown in FIG. 4, a method for manufacturing the stator device for the motor of the first embodiment is shown. The method includes a step of providing two base seats 2 that are spaced apart from each other along the axis (L) and each including a base member 21 and a bearing-receiving groove 23 open away from the other one of the base seats 2 along the axis (L), a stator 3 disposed between the base members 21 of the base seats 2, and two mushroom-shaped members 6. The base member 21 of each of the base seats 2 is formed with an axial hole 22 that extends along the axis (L) through the base member 21, a receiving space 24 that is open away from the bearing-receiving groove 23 along the axis (L), and a gel infusing hole 25 that is in spatial communication with ambient surroundings, and that is in fluid communication with the receiving space 24. The stator 3 includes a core 31 and a coil 32 disposed around the core 31. At least a portion of the coil extends into the receiving space 24 of each of the base seats 2. Each of the mushroom-shaped members 6 is complementary in shape with the axial holes 22 of each of the base seats 2. In this embodiment, the mushroom-shaped member 6 is made of epoxy resin and the present disclosure is not limited to the material for making the mushroom-shaped member 6.

The method further includes a step of inserting the mushroom-shaped members 6 respectively through the axial holes 22 of the base seats 2. The method further includes, after the step of inserting the mushroom-shaped members 6, a step of infusing a gel material 400 among the stator 3 and the base seats 2 and into the receiving spaces 24 of the base seats 2, respectively through the gel infusing holes 25 of the base seats 2, to cover at least a portion of the stator 3 and connect the stator 3 to the base seats 2. In this embodiment, the gel material 400 is infused using a low pressure injection technique.

The method further includes a step of solidifying the gel material 400 to form a gel body 4 to position the stator 3 relative to the base seats 2.

The method further includes, after the gel material 400 is solidified, a step of removing the mushroom-shaped member 6 from the base seats 2. It should be noted that in this embodiment, the gel material 400 is infused using a low pressure injection technique and thus is solidified and cooled down relatively fast. As such, the gel material 400 infused into the receiving spaces 24 would not flow into the core 31 easily. In this way, the gel material 400 can be infused into the receiving spaces 24 simultaneously through the gel infusing holes 25, respectively.

Additionally, in other embodiments, the mushroom-shaped member 6 may be omitted and the amount of the gel material 400 to be infused into the receiving spaces 24 is controlled to meet the requirement of forming the gel body 4. In another embodiment, after the gel material 400 infused into the receiving spaces 24 is solidified, an excess portion of the gel material 400 in the receiving spaces 24 is removed by, e.g., scraping, to form the gel body 4. It should be noted that the first surrounding portions 41 of the gel body 4 surround respectively the insertion portions 321 of the coil 32 in this embodiment.

Figure 5:
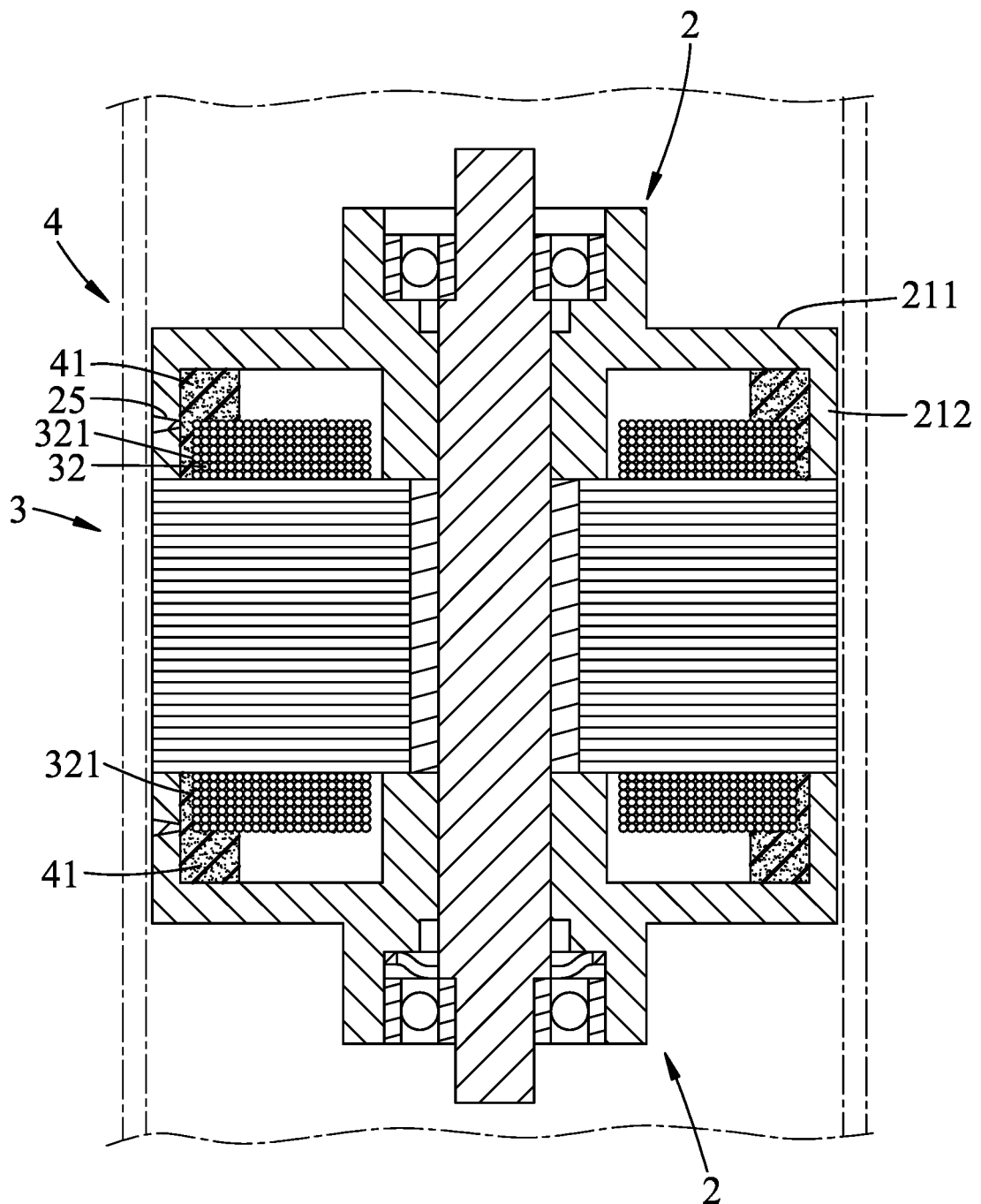
FIG. 5 is a fragmentary schematic sectional view illustrating a configuration of a gel body of the first embodiment being modified.

In a modification of this embodiment, as shown in FIG. 5, the first surrounding portions 41 only surround a portion of the insertion portions 321 of the coil 32. The configuration of the first surrounding portions 41 of the gel body 4 may be modified as long as the first surrounding portions 41 are connected to a portion of the base wall 211 and a portion of the outer surrounding wall 212 of each of the base seats 2 to position the stator 3 between the base seats 2.

Figure 6:
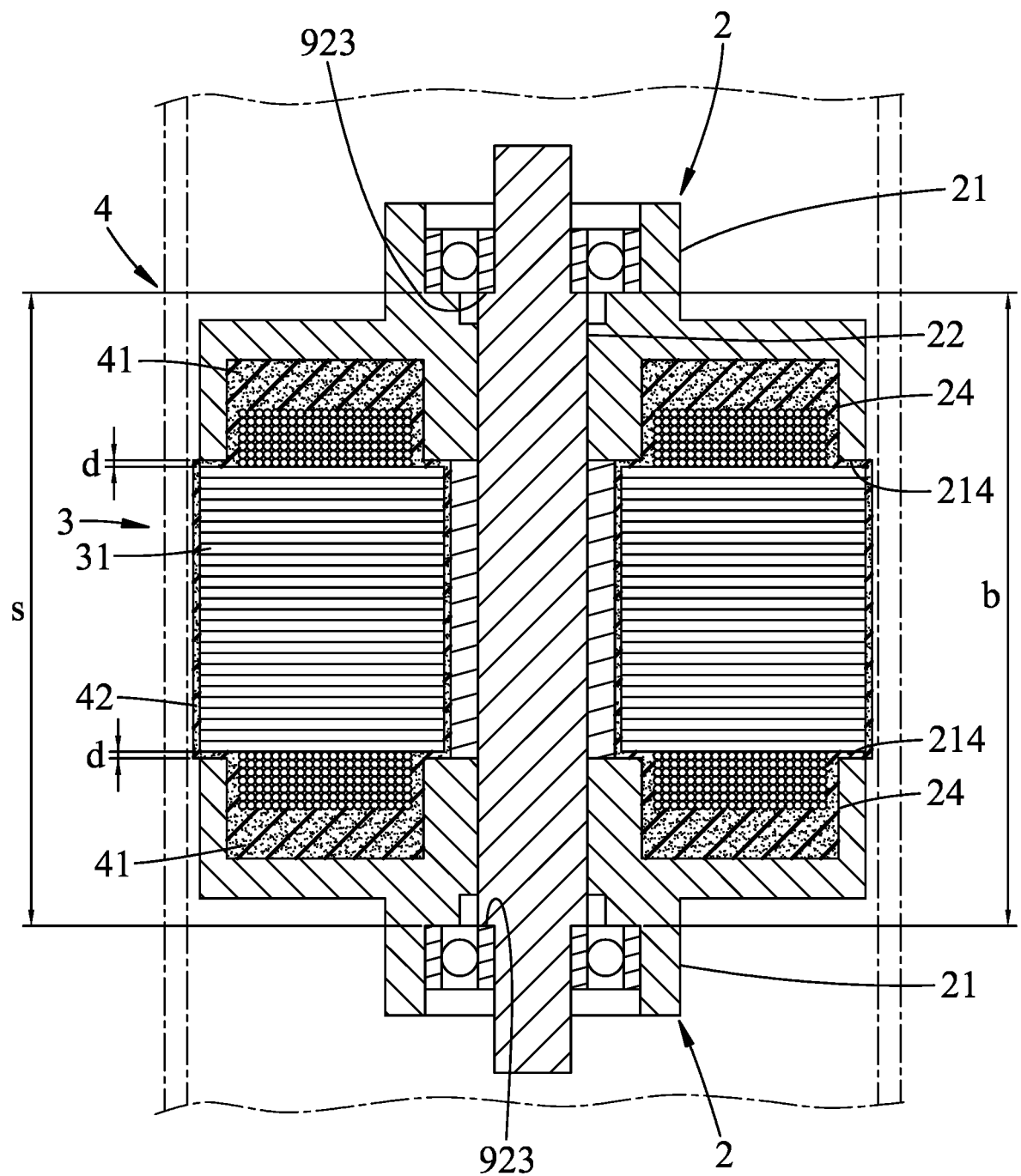
FIG. 6 is a fragmentary schematic sectional view illustrating a second embodiment of the stator device for a motor that includes two bearing sets, an output shaft and a rotor according to the present disclosure.

Referring to FIG. 6, the stator device for a motor according to a second embodiment of the present disclosure is similar to the first embodiment and the differences therebetween are described as follows. In the second embodiment, the stator device includes the base seats 2, the stator 3, the gel body 4 and does not include the biasing member 5 shown in FIG. 3. The base member 21 of each of the base seats 2 is formed with the axial hole 22 and the receiving space 24 and is not formed with the gel infusing hole 25 shown in FIG. 3.

The gel body 4 further includes a second surrounding portion 42 sleeved on the core 31 and connected between the first surrounding portions 41.

Figure 7A:
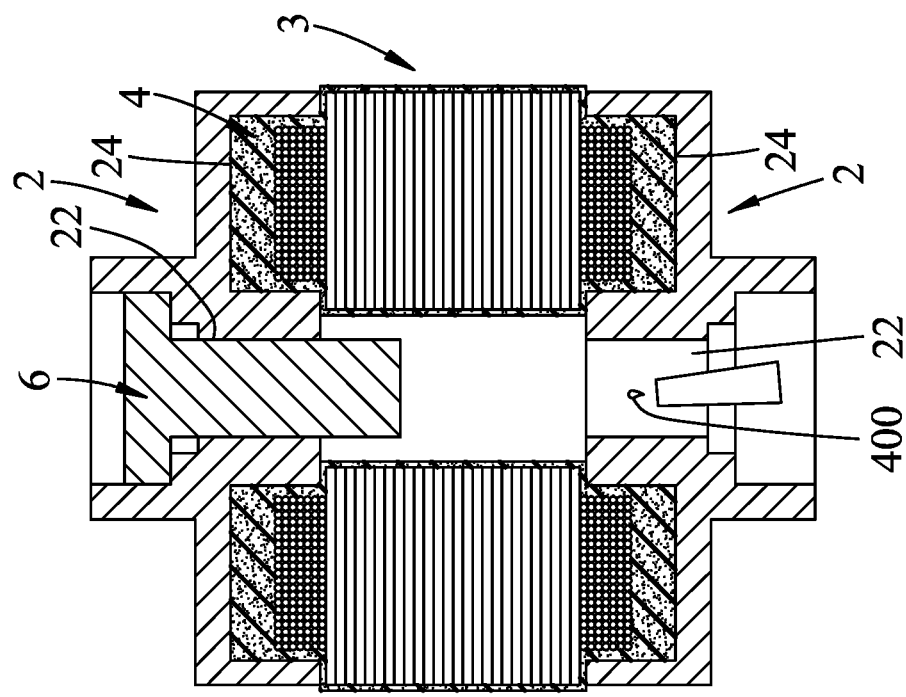
FIGS. 7A and 7B are schematic sectional views of the second embodiment, illustrating how the second embodiment is manufactured.
Figure 7B:
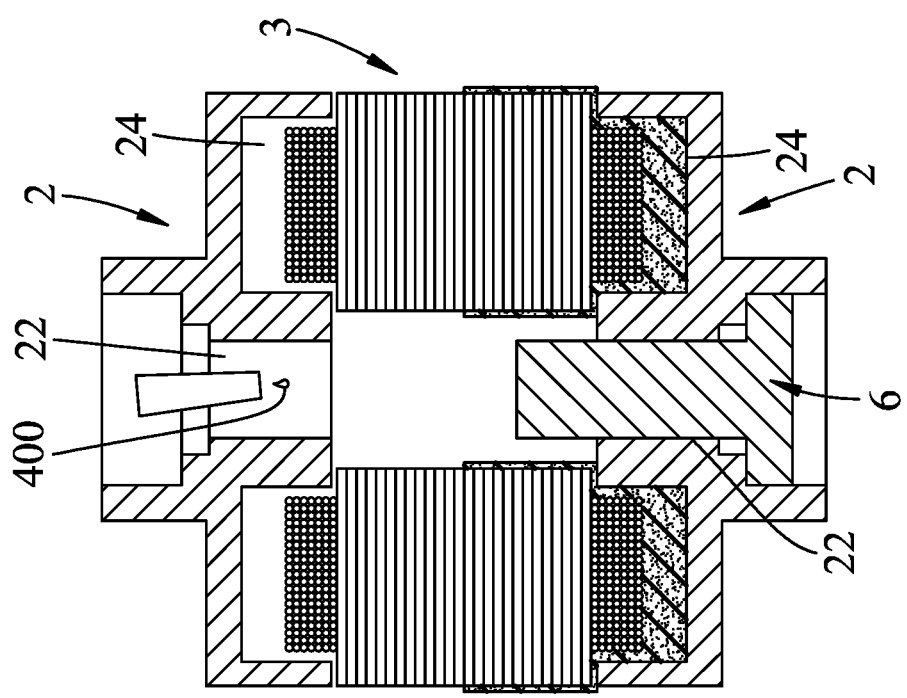

Referring to FIGS. 7A and 7B, a method for manufacturing the stator device of the second embodiment is similar to the method shown in FIG. 4 and the differences therebetween are described as follows. In this embodiment, the step of providing the mushroom-shaped member 6 provides only one mushroom-shaped member 6. Before the step of infusing the gel material 400, the step of inserting the mushroom-shaped member 6 includes inserting the mushroom-shaped member 6 through the axial hole 22 of one of the base seats 2. In the following description, the upper one of the base seats 2 shown in FIGS. 7A and 7B is referred to as an upper base seat 2 and the lower one of the base seats 2 is referred to as a lower base seat 2 for ease of illustration. As shown in FIG. 7A, in this embodiment, the step of inserting the mushroom-shaped member 6 includes inserting the mushroom-shaped member 6 through the axial hole 22 of the lower base seat 2. The step of infusing the gel material 400 includes infusing the gel material 400 into the receiving space 24 of the lower base seat 2, through which the mushroom-shaped member 6 extends, through the axial hole 22 of the upper base seat 2. The method further includes, after the gel material 400 infused into the receiving space 24 of the lower base seat 2 is solidified, moving the mushroom-shaped member 6 out of the lower base seat 2 and into the axial hole 22 of the upper base seat 2 (see FIG. 7B). The step of infusing the gel material 400 further includes infusing the gel material 400 into the receiving space 24 of the upper base seat 2, through which the mushroom-shaped member 6 extends, through the axial hole 22 of the lower base seat 2. The method further includes, after the gel material 400 infused into the receiving space 24 of the upper base seat 2 is solidified, removing the mushroom-shaped member 6 from the upper base seat 2.

In this embodiment, a low pressure injection technique is not employed to infuse the gel material 400, and the gel material 400 is solidified relatively slowly. As a result, in the method for manufacturing the second embodiment, the gel material 400 is infused into the receiving space 24 of the lower base seat 2 first and then is infused into the receiving space 24 of the upper base seat 2 after the gel material 400 infused into the receiving space 24 of the lower base seat 2 is solidified.

It should be noted that by virtue of the arrangement of the second surrounding portions 42 of the gel body 4, a distance between the bearing-receiving groove 23 can be adjusted when manufacturing the stator device. Specifically, as shown in FIG. 6, the connecting surface 214 of each of the base seats 2 is spaced apart from the core 31 by a distance (d), whereas each of the connecting surfaces 214 of the first embodiment shown in FIG. 3 abut against the core 31, so that the distance (b) between the bearing-receiving groove 23 is made equal to the distance (s) between the shoulders 923 of the output shaft 92. Thus, the biasing member 5 shown in FIG. 3 can be omitted in this embodiment.

Figure 8:
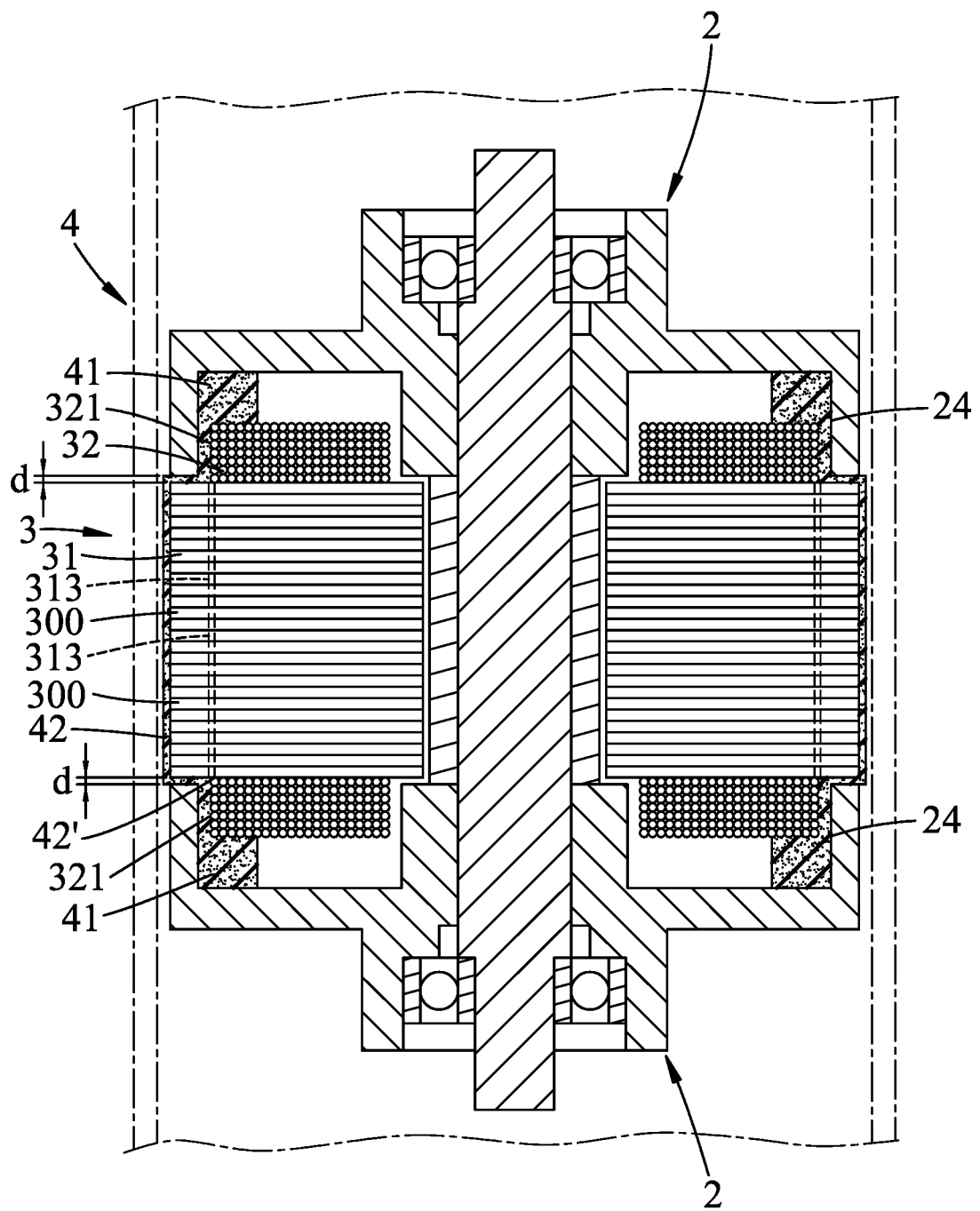
FIG. 8 is a fragmentary schematic sectional view illustrating a configuration of a gel body of the second embodiment being modified.

Referring to FIG. 8, a modification of the second embodiment is shown. In this modification, the core is formed with a row of through holes 313 extending respectively through the silicon steel plates 300. The gel body 4 further includes a filling portion 42' connected to the first surrounding portions 41 and filled within the through holes 313, so as to increase a connection strength among the silicon steel plates 300. Further, the first surrounding portions 41 of the gel body 4 are disposed respectively in the receiving spaces 24 and each partially surrounds a corresponding one of the insertion portions 321, and the second surrounding portion 42 is sleeved on the core 31 and is connected between the first surrounding portions 41. In a method for manufacturing this modification, the step of infusing the gel material 400 includes infusing the gel material 400 into a space among an outer surface of the core 31 and the base seats 2. Each of the second embodiment and a modification thereof possesses the same advantage of the first embodiment.

Figure 9:
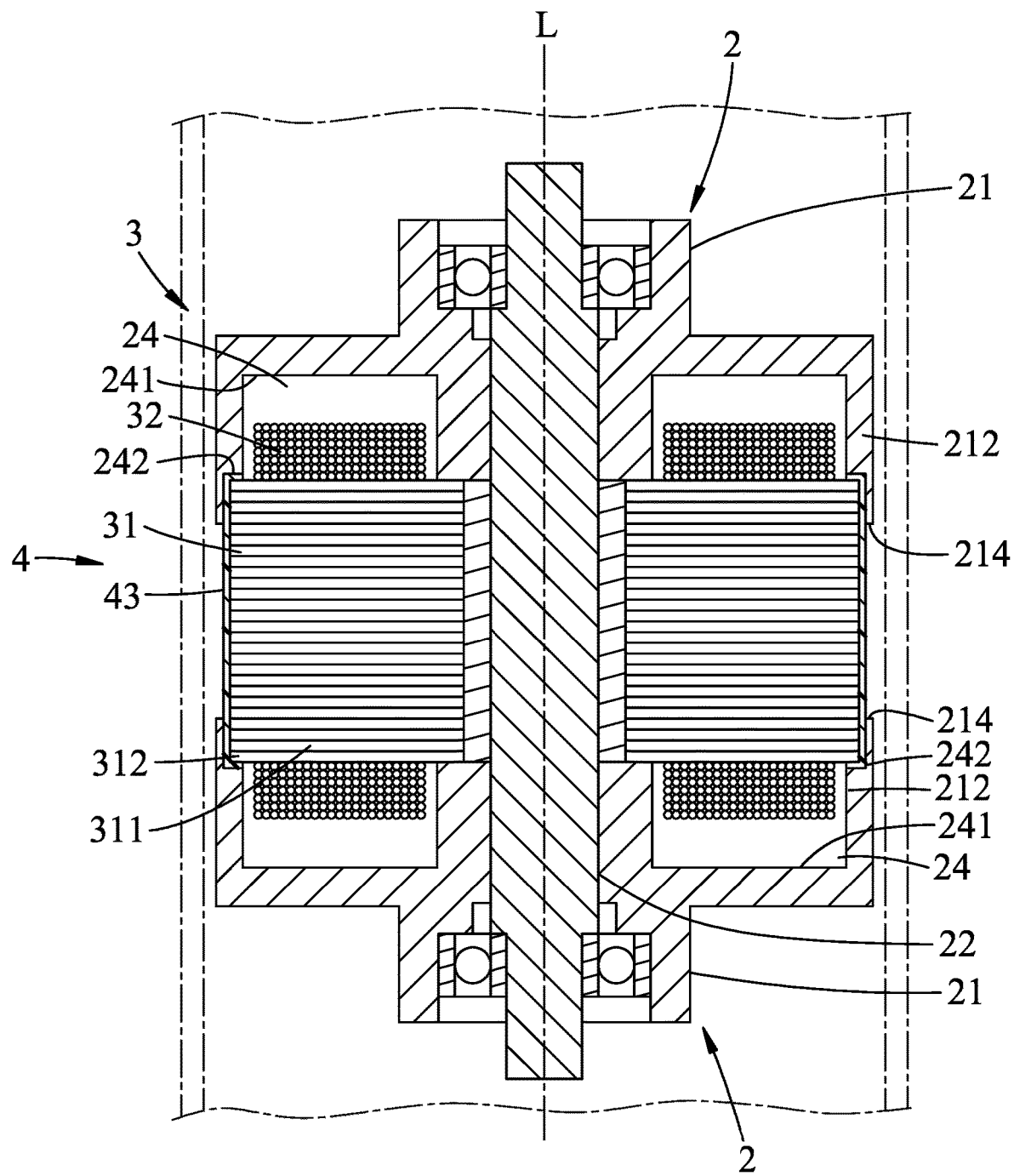
FIG. 9 is a fragmentary schematic sectional view illustrating a third embodiment of the stator device for a motor that includes two bearing sets, an output shaft and a rotor according to the present disclosure.

Referring to FIG. 9, the stator device for a motor according to a third embodiment of the present disclosure is similar to the second embodiment and the differences therebetween reside in the following.

In the third embodiment, the core 31 of the stator 3 includes a central portion 311 and a heat dissipating portion 312. The coil 32 of the stator 3 is wound on the central portion 311. The heat dissipating portion 312 is connected to and disposed around the central portion 311. The gel body 4 includes a connecting portion 43 sleeved on the heat dissipating portion 312 and having opposite ends attached respectively to the outer surrounding walls 212 of the base members 21.

The receiving space 24 of each of the base seats 2 has a stepped shape and includes an inner annular portion 241 and an outer annular portion 242. For each of the base seats 2, the inner annular portion 241 is disposed adjacent to the axial hole 22 and receives the coil 32 therein, and the outer annular portion 242 surrounds the inner annular portion 241, has a dimension along the axis (L) smaller than that of the inner annular portion 241, and receives a portion of the heat dissipating portions 312 of the core 31 and a portion of the connecting portion 43 of the gel body 4 therein such that the connecting portion 43 is attached to the outer surrounding walls 212.

Figure 10:
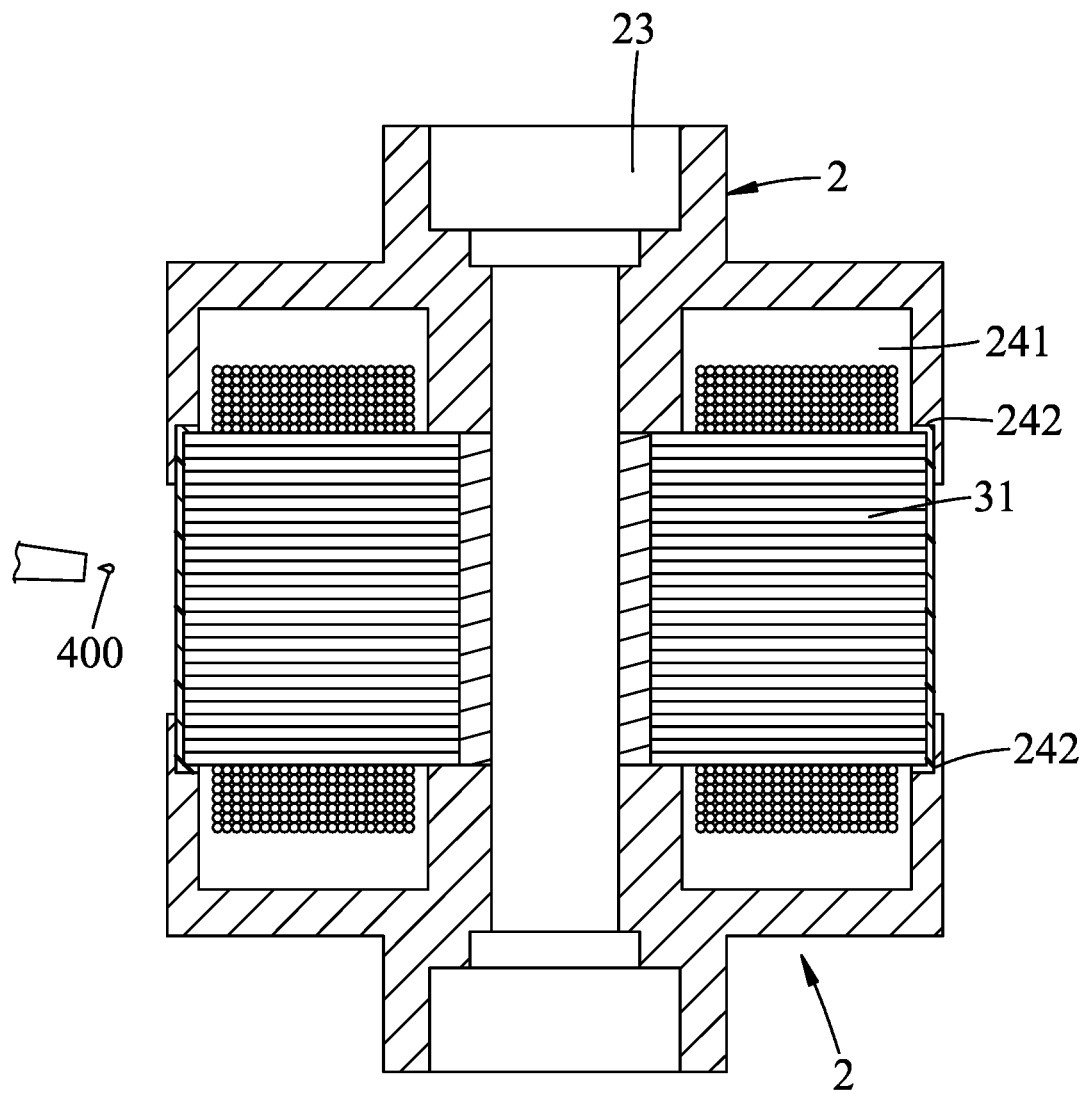
FIG. 10 is a schematic sectional view illustrating how the stator device of the third embodiment is manufactured.

As shown in FIG. 10, in a method for manufacturing the third embodiment, the step of infusing a gel material 400 includes infusing the gel material 400 into the outer annular portion 242 of each of the base seats 2 to cover at least a portion of the core 31 to form the connecting portion 43.

By virtue of the configuration of the stepped shape of the receiving space 24 of each of the base seats 2, a contact area among the gel body 4 and the outer surround walls 212 of the base members 21 is increased, so that the connection strength therebetween can be increased. The third embodiment possesses the same advantage as the second embodiment.

Figure 11:
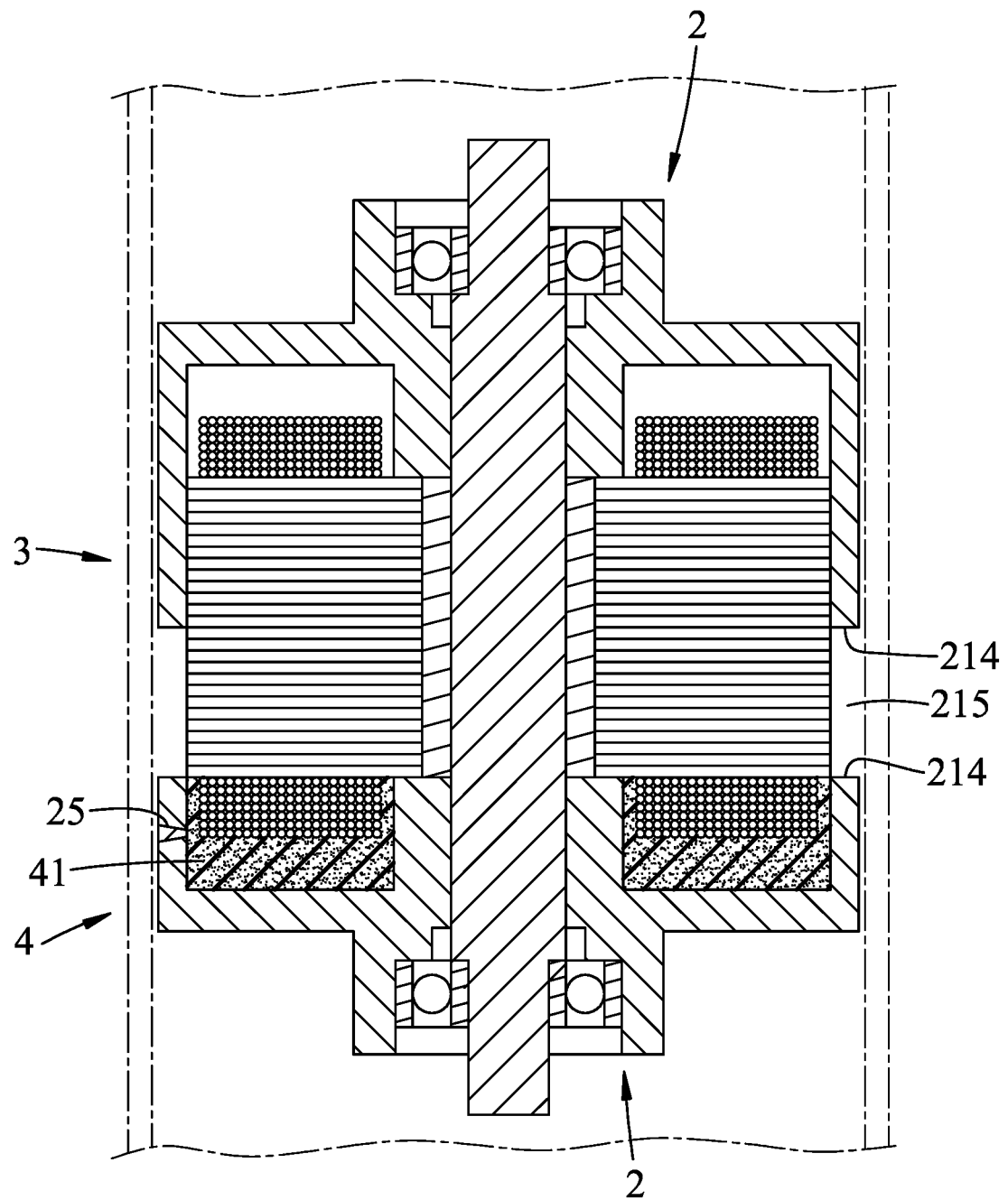
FIG. 11 is a fragmentary schematic sectional view illustrating a fourth embodiment of the stator device for a motor that includes two bearing sets, an output shaft and a rotor according to the present disclosure.

Referring to FIG. 11, the stator device for a motor according to a fourth embodiment is similar to the first embodiment and the differences therebetween reside in the following. In the fourth embodiment, the gel body 4 is merely attached to one of the base seats 2 so as to position the stator 3 relative to the one of the base seats 2. The other one of the base seats 2 is connected to the stator 3 by an adhesive, through engagement therebetween, or through a stator rack (not shown) on which the stator 3 is mounted and to which the other one of the base seats 2 is connected. The manners for connection is not limited to the examples described herein.

That is to say, in the fourth embodiment, the gel body 4 includes only one first surrounding portion 41 attached to one of the base seats 2 and the other one of the base seats 2 does not include the gel infusing hole 25.

In a method of manufacturing the fourth embodiment, the step of infusing the gel material 400 includes infusing the gel material 400 between the stator 3 and one of the base seats 2 to cover at least a portion of the stator 3 and connect the stator 3 to the one of the base seats 2. The step of solidifying the gel material 400 includes solidifying the gel material 400 to form the gel body 4 to position the stator 3 relative to the one of the base seats 2. The method further includes a step of connecting the stator 3 to the other one of the base seats 2.

Since the gel body 4 is connected to only one of the base seats 2, the base seats 2 are not connected to each other. The heat generated by the motor can be dissipated outwardly through the opening 215 between the connecting surfaces 214 and a heat dissipating efficiency can be increased. The fourth embodiment possesses the same advantage as the first embodiment.

Figure 12:
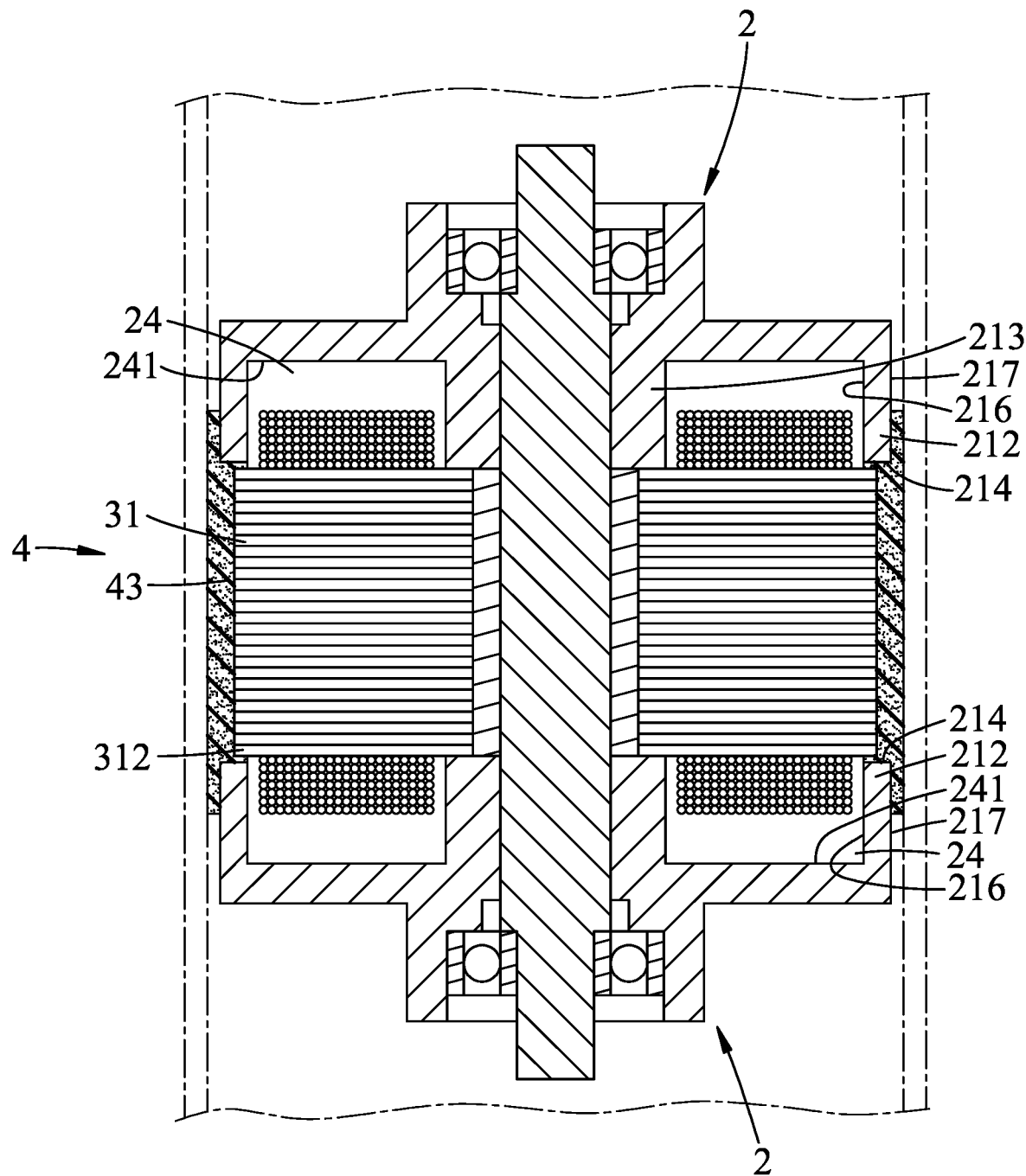
FIG. 12 a fragmentary schematic sectional view illustrating a fifth embodiment of the stator device for a motor that includes two bearing sets, an output shaft and a rotor according to the present disclosure.

Referring to FIG. 12, the stator device for a motor according to a fifth embodiment of the present disclosure is similar to the third embodiment and the differences therebetween are described as follows. In the fifth embodiment, the receiving space 24 of each of the base seats 2 merely includes the inner annular portion 241 and does not include the outer annular portion 242 shown in FIG. 9. For each of the base seats 2, the outer surrounding wall 212 has an inner surface 216 defining the receiving space 24, and an outer surface 217 surrounding the inner surface 216. The connecting surface 214 are connected between the inner surface 216 and the outer surface 217. The heat dissipating portion 312 of the core 31 are disposed between the connecting surfaces 214. The connecting portion 43 of the gel body 4 is sleeved on the heat dissipating portion 312 and covers the connecting surfaces 214 and a portion of the outer surface 217.

By virtue of the connecting portion 43 that covers the connecting surfaces 214 of the base seats 2 and a portion of the outer surface 217, a contact area among the gel body 4 and the outer surround walls 212 of the base members 21 is increased so that the connection strength therebetween can be increased. The fifth embodiment possesses the same advantage as the third embodiment.

It should be noted that in the embodiments described above, the stator device for a motor of the present disclosure is mounted directly in the bottom bracket 94 of the electric bicycle. In other embodiments, the stator device may be mounted in a protective cover (not shown) and then be mounted in the bottom bracket 94 to prevent the stator device from being damaged by dust, water and impurities, which adversely affect efficiency of the motor.

To sum up, by virtue of the arrangement of the gel body 4 that is attached to at least one of the base seats 2, the base seats 2 can be spaced apart from each other and are not connected to each other while positioning the stator 3 therebetween. Further, the structure of the base seats 2 enables heat generated by the motor to be dissipated outwardly through the opening 215 between the connecting surfaces 214 and thus the heat dissipating efficiency can be increased. Additionally, since the bearing-receiving groove 23 of each of the base seats 2 is open away from the other one of the base seats 2 along the axis (L), it is relatively convenient to repair the bearing sets 91 that are disposed respectively in the bearing-receiving grooves 23 as required.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A stator device for a motor including an output shaft extending along an axis and two bearing sets, said stator device comprising:
   two base seats spaced apart from each other along the axis, each of said base seats including a base member that is formed with an axial hole extending along the axis through said base member and adapted to permit the output shaft to extend therethrough, and a bearing-receiving groove open away from the other one of said base seats along the axis, and that has a connecting surface facing away from said bearing-receiving groove;
   a stator adapted to be disposed around the output shaft and between said base members of said base seats, and including a core and a coil that is disposed around said core,
   a gel body attached to and disposed around at least a portion of said stator, and attached to one of said base seats so as to position said stator relative to the one of said base seats, and
   a biasing member disposed in one of said bearing-receiving grooves of said base seats;
   wherein:
   said gel body is attached to said base seats to fix said stator between said base seats;
   said base member of each of said base seats is further formed with a receiving space open away from said bearing-receiving groove along the axis, and a gel infusing hole in spatial communication with ambient surroundings, in fluid communication with said receiving space, and adapted to permit a gel material to be infused into said receiving space to form said gel body, said coil including two insertion portions disposed respectively in said receiving spaces of said base seats, said gel body including two first surrounding portions disposed respectively in said receiving spaces and each partially surrounding a corresponding one of said insertion portions;
   said bearing-receiving grooves of said base seats are adapted to respectively receive the bearing sets therein; and
   said biasing member is adapted to be connected to and biases one of the bearing sets that is received in the one of said bearing-receiving grooves away from the other one of the bearing sets.

2. The stator device for a motor as claimed in claim 1, wherein said base member of each of said base seats includes
   a base wall including an inner periphery and an outer periphery,
   an outer surrounding wall extending from said outer periphery of said base wall toward said base member of the other one of said base seats, and having said connecting surface, and
   an inner surrounding wall extending from said inner periphery of said base wall toward said base member of the other one of said base seats, defining said axial hole, surrounded by said outer surrounding wall, and cooperating with said base wall and said outer surrounding wall to define said receiving space.

3. A stator device for a motor including an output shaft extending along an axis, said stator device comprising:
   two base seats spaced apart from each other along the axis, each of said base seats including a base member that is formed with an axial hole extending along the axis through said base member and adapted to permit the output shaft to extend therethrough, and a bearing-receiving groove open away from the other one of said base seats along the axis, and that has a connecting surface facing away from said bearing-receiving groove;
   a stator adapted to be disposed around the output shaft and between said base members of said base seats, and including a core and a coil that is disposed around said core, and
   a gel body attached to and disposed around at least a portion of said stator, and attached to one of said base seats so as to position said stator relative to the one of said base seats;
   wherein:
   said gel body is attached to said base seats to fix said stator between said base seats;
   said base member of each of said base seats is further formed with a receiving space open away from said bearing-receiving groove along the axis, said coil including two insertion portions disposed respectively in said receiving spaces of said base seats, said gel body including two first surrounding portions which are disposed respectively in said receiving spaces and each of which partially surrounds a corresponding one of said insertion portions, and a second surrounding portion which is sleeved on said core, and which is connected between said first surrounding portions.

4. The stator device for a motor as claimed in claim 3, wherein said core includes a plurality of silicon steel plates, and is formed with a row of through holes extending respectively through said silicon steel plates, said gel body further including a filling portion connected to said first surrounding portions and filled within said through holes, so as to increase a connection strength among said silicon steel plates.

5. The stator device for a motor as claimed in claim 3, wherein said base member of each of said base seats includes
   a base wall including an inner periphery and an outer periphery,
   an outer surrounding wall extending from said outer periphery of said base wall toward said base member of the other one of said base seats, and having said connecting surface, and
   an inner surrounding wall extending from said inner periphery of said base wall toward said base member of the other one of said base seats, defining said axial hole, surrounded by said outer surrounding wall, and cooperating with said base wall and said outer surrounding wall to define said receiving space.

6. A stator device for a motor including an output shaft extending along an axis, said stator device comprising:
   two base seats spaced apart from each other along the axis, each of said base seats including a base member that is formed with an axial hole extending along the axis through said base member and adapted to permit the output shaft to extend therethrough, and a bearing-receiving groove open away from the other one of said base seats along the axis, and that has a connecting surface facing away from said bearing-receiving groove;
   a stator adapted to be disposed around the output shaft and between said base members of said base seats, and including a core and a coil that is disposed around said core, and
   a gel body attached to and disposed around at least a portion of said stator, and attached to one of said base seats so as to position said stator relative to the one of said base seats;

wherein:
   said gel body is attached to said base seats to fix said stator between said base seats;
   said base member of each of said base seats is further formed with a receiving space open away from said bearing-receiving groove along the axis, and includes
      a base wall including an inner periphery and an outer periphery,
      an outer surrounding wall extending from said outer periphery of said base wall toward said base member of the other one of said base seats, and having said connecting surface, and
      an inner surrounding wall extending from said inner periphery of said base wall toward said base member of the other one of said base seats, defining said axial hole, surrounded by said outer surrounding wall, and cooperating with said base wall and said outer surrounding wall to define said receiving space; and
   said core of said stator includes a central portion around which said coil is disposed, and a heat dissipating portion which is connected to and disposed around said central portion, said gel body including a connecting portion sleeved on said heat dissipating portion and having opposite ends attached respectively to said outer surrounding walls of said base members.

7. The stator device for a motor as claimed in claim 6, wherein said receiving space of each of said base seats has a stepped shape and includes
   an inner annular portion disposed adjacent to said axial hole and receiving said coil therein, and
   an outer annular portion surrounding said inner annular portion, having a dimension along the axis smaller than that of said inner annular portion, and receiving a portion of said heat dissipating portions of said core and a portion of said connecting portion of said gel body therein such that said connecting portion is attached to said outer surrounding wall.

8. The stator device for a motor as claimed in claim 6, wherein, for each of said base seats, said outer surrounding wall has an inner surface defining said receiving space, and an outer surface surrounding said inner surface, said connecting surface being connected between said inner surface and said outer surface, said heat dissipating portion of said core being disposed between said connecting surfaces of said base members, said connecting portion of said gel body being sleeved on said heat dissipating portion and covering said connecting surfaces and a portion of said outer surface.

\* \* \* \* \*